(12) United States Patent
Prater

(10) Patent No.: US 10,184,484 B2
(45) Date of Patent: Jan. 22, 2019

(54) SINGLE INLET/OUTLET CONNECTION FOR TURBOCHARGER COMPRESSOR

(71) Applicant: BorgWarner Inc., Auburn Hills, MI (US)

(72) Inventor: David A. Prater, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 532 days.

(21) Appl. No.: 15/042,139

(22) Filed: Feb. 11, 2016

(65) Prior Publication Data
US 2017/0234325 A1 Aug. 17, 2017

(51) Int. Cl.
F04D 29/44 (2006.01)
F04D 29/42 (2006.01)
F02B 33/40 (2006.01)
F02B 37/00 (2006.01)

(52) U.S. Cl.
CPC .......... *F04D 29/4206* (2013.01); *F02B 33/40* (2013.01); *F02B 37/00* (2013.01); *F05B 2220/40* (2013.01); *F05B 2230/60* (2013.01); *F05D 2220/40* (2013.01); *F05D 2230/60* (2013.01); *Y02T 10/144* (2013.01)

(58) Field of Classification Search
None
See application file for complete search history.

(56) References Cited

U.S. PATENT DOCUMENTS

| 2,422,901 | A | * | 6/1947 | Hunter | F01C 21/0809 |
| | | | | | 415/141 |
| 3,307,485 | A | * | 3/1967 | Logue | F04D 1/12 |
| | | | | | 415/120 |
| 6,324,847 | B1 | | 12/2001 | Pierpont | |
| 7,252,177 | B2 | | 8/2007 | Minato | |
| 7,565,800 | B2 | | 7/2009 | Williams et al. | |
| 7,798,774 | B2 | | 9/2010 | Allport et al. | |
| 8,209,972 | B2 | | 7/2012 | Tuch | |
| 8,590,306 | B2 | * | 11/2013 | Niwa | F02B 39/005 |
| | | | | | 123/41.1 |
| 8,820,071 | B2 | | 9/2014 | Tkac | |

(Continued)

FOREIGN PATENT DOCUMENTS

DE 102007054899 A1 5/2009
EP 1519049 A2 3/2005

OTHER PUBLICATIONS

English language abstract and machine-assisted English translation for DE 10 2007 054 899 extracted from espacenet.com database on Jul. 18, 2018, 14 pages.

(Continued)

*Primary Examiner* — Igor Kershteyn
*Assistant Examiner* — Jason Fountain
(74) *Attorney, Agent, or Firm* — Howard & Howard Attorneys PLLC

(57) ABSTRACT

A compressor device for a turbocharger. The compressor device includes a compressor housing and a separate snorkel member which are provided separately and then connected together. The compressor housing has two air passages separated by a partition wall, while the snorkel member similarly has two separate air ducts separated in part by a partition wall. The two components have mating fittings to connect them together.

16 Claims, 4 Drawing Sheets

(56) References Cited

U.S. PATENT DOCUMENTS 8,944,758 B2    2/2015  Nuhn
2012/0003082 A1* 1/2012  Niwa .................... F02B 39/005
                                                  415/180

OTHER PUBLICATIONS

English language abstract and machine-assisted English translation for EP 1 519 049 extracted from espacenet.com database on Jul. 18, 2018, 14 pages.

* cited by examiner

US 10,184,484 B2

SINGLE INLET/OUTLET CONNECTION FOR TURBOCHARGER COMPRESSOR

TECHNICAL FIELD

The present invention relates to turbochargers for vehicle engines, and more particularly to compressors for turbochargers.

BACKGROUND OF THE INVENTION

Turbochargers for vehicle engines, particularly internal combustion engines, are in wide spread use today. Turbochargers are used to increase engine power output by providing higher charge-air density such that more fuel can be burned in each engine cycle. Turbochargers can increase horsepower output and allow engines to operate more efficiently even at reduced speeds and loads. Turbochargers also can be used with exhaust gas recirculation systems which improve fuel economy and reduce undesirable emissions.

The use of turbochargers permits use of smaller engines and still maintain similar power and performance as larger engines. This also leads to the design and production of smaller and lighter vehicles. The resultant savings in weight also creates increased fuel economy and vehicles which can be produced and sold at less cost.

Smaller engines and smaller vehicles, however, create significant constraints in packaging and assembly of accessories in the engine compartments. The packaging within the engine environment is made difficult by components such as alternators and AC compressors, as well as steering columns for different vehicle configurations, motor mounts, exhaust systems, engine heads, and the engine block itself.

With turbocharged engines, the location of the turbocharger on the engine and its proximity to other components, can cause similar packaging and assembly issues with air ducting to the inlet and outlet of the compressor. Controlling cost is also a significant issue, and minimizing the size and weight of the compressor and other turbocharger components is also a priority.

SUMMARY OF THE INVENTION

The present invention was designed with the above issues in mind and creates a unique solution which minimizes or overcomes the packaging and assembly issues. The invention provides a compressor for a turbocharger which has two components: a compressor housing and a snorkel member, each with two air passageways. The compressor wheel is positioned inside the compressor housing and the compressor air inlet and compressor air outlet are positioned side-by-side in a single connector or duct member. The compressor inlet air is directed to the compressor wheel in an axial direction and is expelled in a radial direction. A dividing wall separates the inlet air and outlet air passageways in the single connector.

The snorkel member has two elongated air ducts which merge and meet at a single connector fitting which is connected to a mating connector fitting on the compressor housing member. The compressor inlet and outlet pierce points are both preferably contained on the snorkel member.

The compressor air inlet passageway is curved and the compressor air outlet passageway is wrapped around the air inlet passageway so that both the inlet and outlet ports to and from the compressor housing are in the same plane. A dividing wall starting at the connector fitting separates the inlet and outlet duct air flow passageways. The dividing wall mates with a dividing wall in the snorkel member.

The distal ends of the two elongated air ducts on the snorkel member are adapted to mate with, and be connected to, the inlet and outlet air duct pierce points on the vehicle engine.

The invention minimizes packing and assembly issues, and also provides a compressor which is less expensive to produce than currently known compressors. The invention further allows the same turbocharger to be used with different engines, different interfaces, and different pierce point locations.

Other aspects, benefits and advantages of the present invention will become apparent from the following written description of the invention, in combination with the attached drawings and appended claims.

DESCRIPTION OF PREFERRED EMBODIMENTS

The present invention can be used with a wide variety of turbochargers and turbocharger systems. It can be used with turbochargers and turbocharger systems which utilize exhaust gas recirculation ("EGR") or with simpler or basic turbochargers and turbocharging systems. It is particularly adapted to be used with turbocharger systems used in the smaller and lighter internal combustion engines and vehicles in use today, particularly where there are packaging constraints within the engine environment and/or where assembly issues are significant. Reduction of cost is also a major consideration.

For purposes of illustration, but not in any way to limit the current invention, the invention will first be described with respect to a turbocharger system which uses exhaust gas recirculation. It is to be understood, however, that such a system is only one in which the present invention can be utilized.

Figure 1:
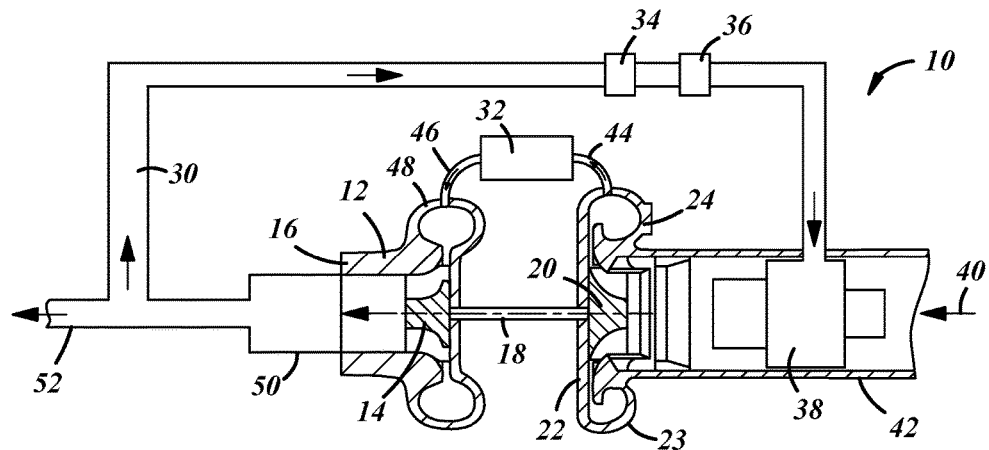
FIG. 1 is a schematic highly simplified illustration of a turbocharger system in which the present invention could be utilized.

The turbocharger system 10 as depicted in FIG. 1 has a turbine 12 and a compressor 24. The turbine has a turbine wheel 14 positioned in a turbine housing 16. The turbine wheel 14 is connected by a rotor shaft member 18 to a compressor wheel 20. The compressor wheel 20 is positioned in a compressor housing 22 of the compressor 24.

Inlet air 40 is introduced through air inlet 42 into the compressor housing 22. The turbine drives the compressor wheel 20 which then directs pressurized air to the engine through duct 44. Exhaust from the engine exits through exhaust duct 46. The exhaust gases enter the turbine radially through turbine air inlet 48 and are exhausted axially through turbine air outlet 50. The exhaust gas then passes through conventional components such as a catalytic converter and/or a particulate filter (not shown) and exhausted to the atmosphere through exhaust pipe or duct 52.

For exhaust-gas recirculation, a portion of the exhaust gases from the turbine 12 flow through exhaust-gas recirculation line 30 and are re-entered into the turbocharger system in the compressor air inlet 42. Typical components in an exhaust-gas recirculation system could include a regulative valve 34 and a cooler 36. The exhaust gases are mixed with the inlet air in a mixing area 38 and mixed together by a mixing device (not shown). The mixed combination of air and exhaust gases then flow into the compressor housing 24.

Turbocharger compressors also typically have a diffuser member as known to persons skilled in the turbocharger art. The diffuser can be formed by the compressor backplate 23, one side surface and the compressor cover or housing on the other side. The blades of the compressor wheel typically have a complex shape in order to maximize its efficiency, as paired with the turbine wheel.

The compressor stage of a turbocharger works by drawing in air from an air cleaner, or air and exhaust gas as indicated above, into the compressor housing inlet axially and then expelling the air radially through the rotational speed of the compressor wheel. The compressor increases the pressure and temperature of the air.

As indicated above, the smaller engines and vehicles today create significant constrains in packaging turbochargers, as well as many other components and accessories in the engine compartment. The turbocharger components compete in location and spacing with other engine and vehicle components, such as alternators, AC compressors, steering columns, and exhaust systems, as well as the engine block, engine heads and other necessary components and accessories. The present invention, as shown in FIGS. 2-7, is designed to overcome these packaging issues, and at the same time to meet cost, weight and size requirements.

Figure 2:
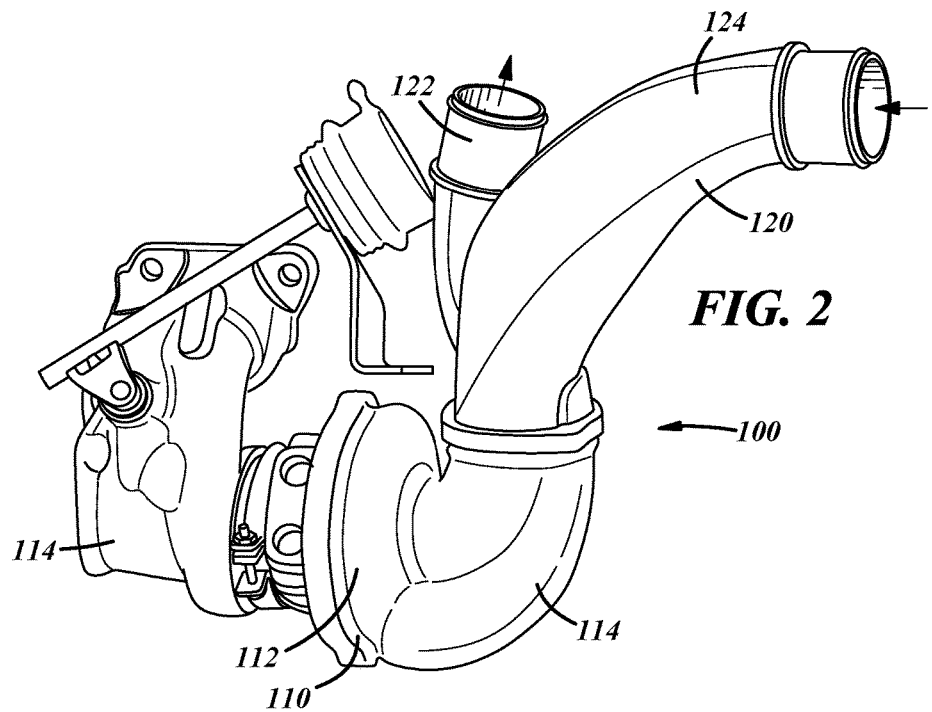
FIG. 2 is a perspective view of a two-component turbocharger compressor in accordance with an embodiment of the invention.

As shown in FIG. 2, the inventive compressor device 100 includes a compressor housing member 110 and a compressor snorkel member 120. The compressor housing member 110 has a base member 112 and a connector or duct member 114. The inlet air to the compressor can be simply atmospheric air that has passed through an air filter or the like, or it can be, for example, a combination of atmospheric air mixed with a portion of the exhaust gases which are being recirculated.

The snorkel member 120 for the compressor has two elongated duct members 122 and 124 that are merged together where they meet and are attached to the compressor housing 110.

Figure 3:
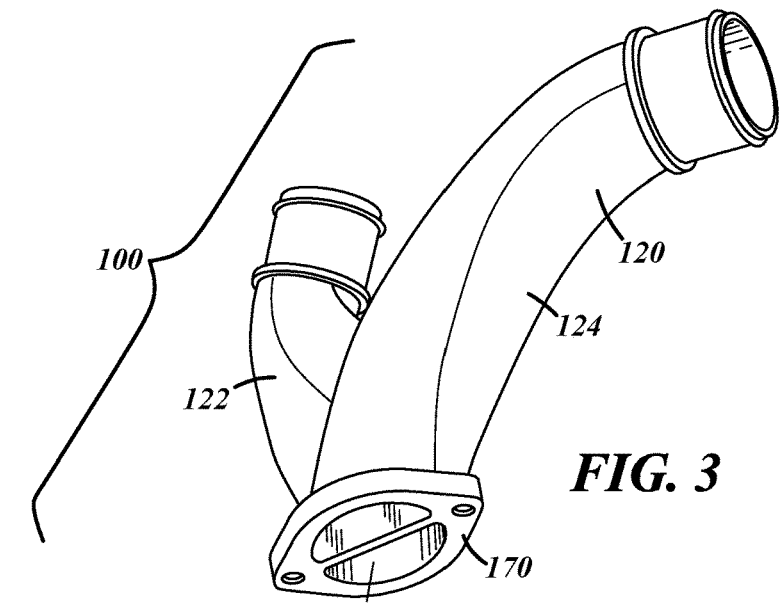
FIG. 3 is an exploded perspective view of the turbocharger compressor as shown in FIG. 2.
Figure 4:
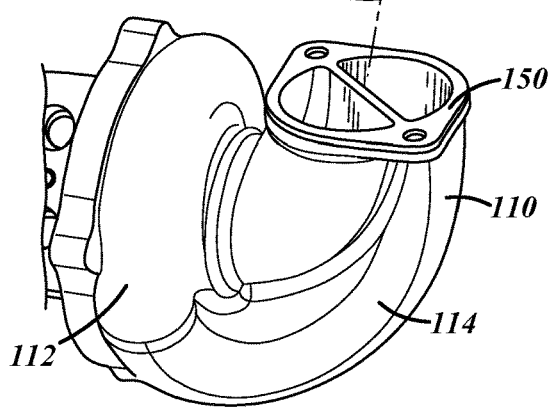
FIG. 4 depicts the compressor housing as shown in FIGS. 2 and 3.
Figure 4:
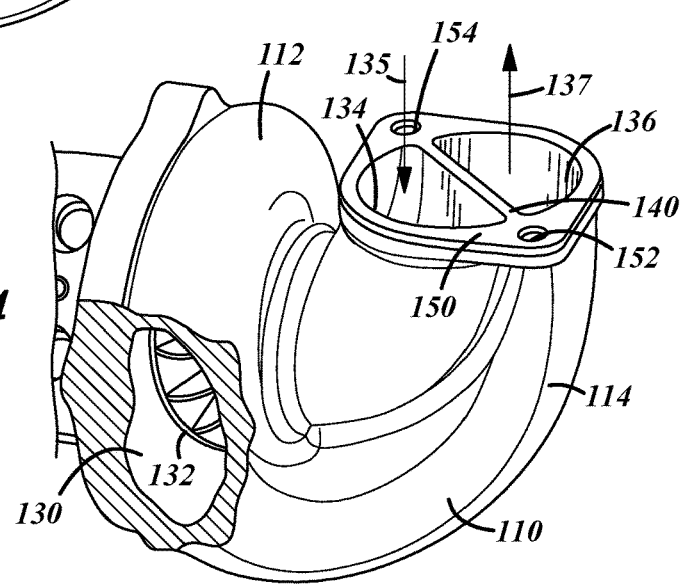
Figure 5:
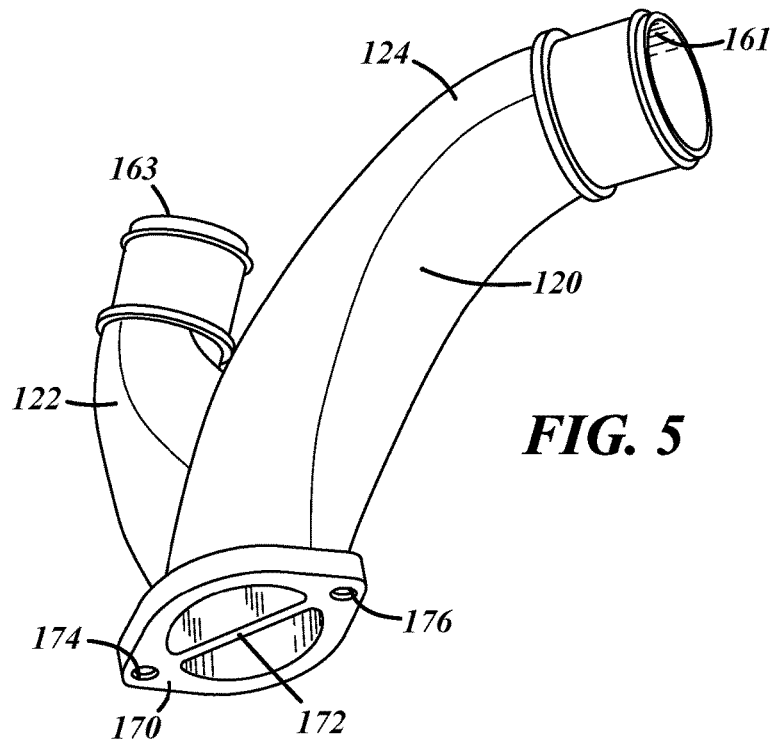
FIG. 5 depicts the snorkel member as shown in FIGS. 2 and 3.

FIGS. 3-5 depict the two compressor device components 110 and 120 in more detail, with FIG. 3 being an exploded view, and FIGS. 4 and 5 depicting the two components separately.

The compressor housing 110 is preferably a single piece cast metal device. The metal material is preferably aluminum, although other metal or suitable plastic materials could be utilized. The housing has a central chamber 130 in the base member 112 in which the compressor wheel 132 is positioned. The single connector member 114 has two side-by-side air passageways: an inlet passageway 134 and an outlet passageway 136. Arrows 135 and 137 show the direction of the two air flows.

The two air passageways 134 and 136 are curved and separated by a partition wall member 140 throughout their lengths. Inlet air passageway 134 has a curved configuration with a significant turn and supplies the inlet air in an axial direction to the compressor wheel 132. The outlet air passageway 136 is also curved and is positioned radially outside the inlet air passageway and wraps around it.

Air flow through the inlet and outlet air passageways are in the opposite direction, as shown by arrows 135 and 137. The air leaving the compressor exits radially through the curved outlet air passageway 136.

The inlet and outlet air passageways in the compressor housing 110 have the same mounting face or fitting 150. This allows connection of the compressor inlet and outlet passageways in a common plane and with a single physical connection. Fastener holes 152 and 154 are provided for this purpose. This allows for ease of connection, particularly where packaging is constrictive.

With current designs, two separate pierce points are typically provided for the compressor inlet and outlet. A pierce point is the contact point of the turbocharger with the customer's components, such as the air flow ducts and other attachable components in the engine or engine environment with which the turbocharger device is designed to interface or be connected to. Two separate connections are typically needed to connect the turbocharger compressor to the air passageway system of an engine.

The compressor snorkel member 120, as shown in FIGS. 2-3 and 5, is also a single piece cast member. The material for the snorkel member preferably is a metal material, such as aluminum, but other comparable metal or plastic material could be utilized. The snorkel member 120 has two separate air ducts 122 and 124. Duct 124 provides inlet air to the compressor housing and duct 122 provides a passageway for the outlet air from the compressor housing. The ends 161 and 163, of the ducts 124 and 122, respectfully, are adapted to be connected to a customer's air ducts in the engine compartment.

The snorkel member 120 has a mounting face or fitting 170 which connects with the mounting face or fitting 150 on the compressor housing 110. The two air ducts 122 and 124 merge and end side-by-side in a common plane of fitting 170. The two air ducts 122 and 124 are separated adjacent the fitting 170 by a partition wall 172, and separate in order to mate with the customer's air ducts at the pierce points.

When the snorkel member 120 is attached to the compressor housing 110, the partition walls 172 and 140 coincide and maintain separation of the inlet and outlet gas flows. Holes 174 and 176 in the snorkel member fitting 170 are provided to allow connection of the snorkel member with the compressor housing. The holes 174 and 176 align with holes 154 and 152 on the fitting 150 on the compressor housing.

As indicated, the compressor housing inlet passageway 134 has a curved configuration and the compressor outlet passageway 136 also is curved and is wrapped partially around the inlet passageway. As shown, the passageway 134 has a curve which is about 90° in order to provide inlet air in the axial direction to the compressor wheel, but a 90° angle is not critical so long as the inlet air enters in that direction. The compressor housing inlet and outlet ports and the corresponding ports on the snorkel member are preferably in the same plane.

As indicated, the compressor device 100 thus has two separate components, namely the compressor housing member 110 and the compressor snorkel member 120. When the two components are connected together, they form a one-piece device with the compressor inlet and outlet pierce points contained within the snorkel member.

Separation of the snorkel member and its air ducts from the compressor housing and its air ducts can provide significant cost savings, as well as decreasing in the overall weight and size of the compressor device. This also allows the same turbocharger to be used with different engines, different interfaces, and different pierce point locations.

Figure 6:
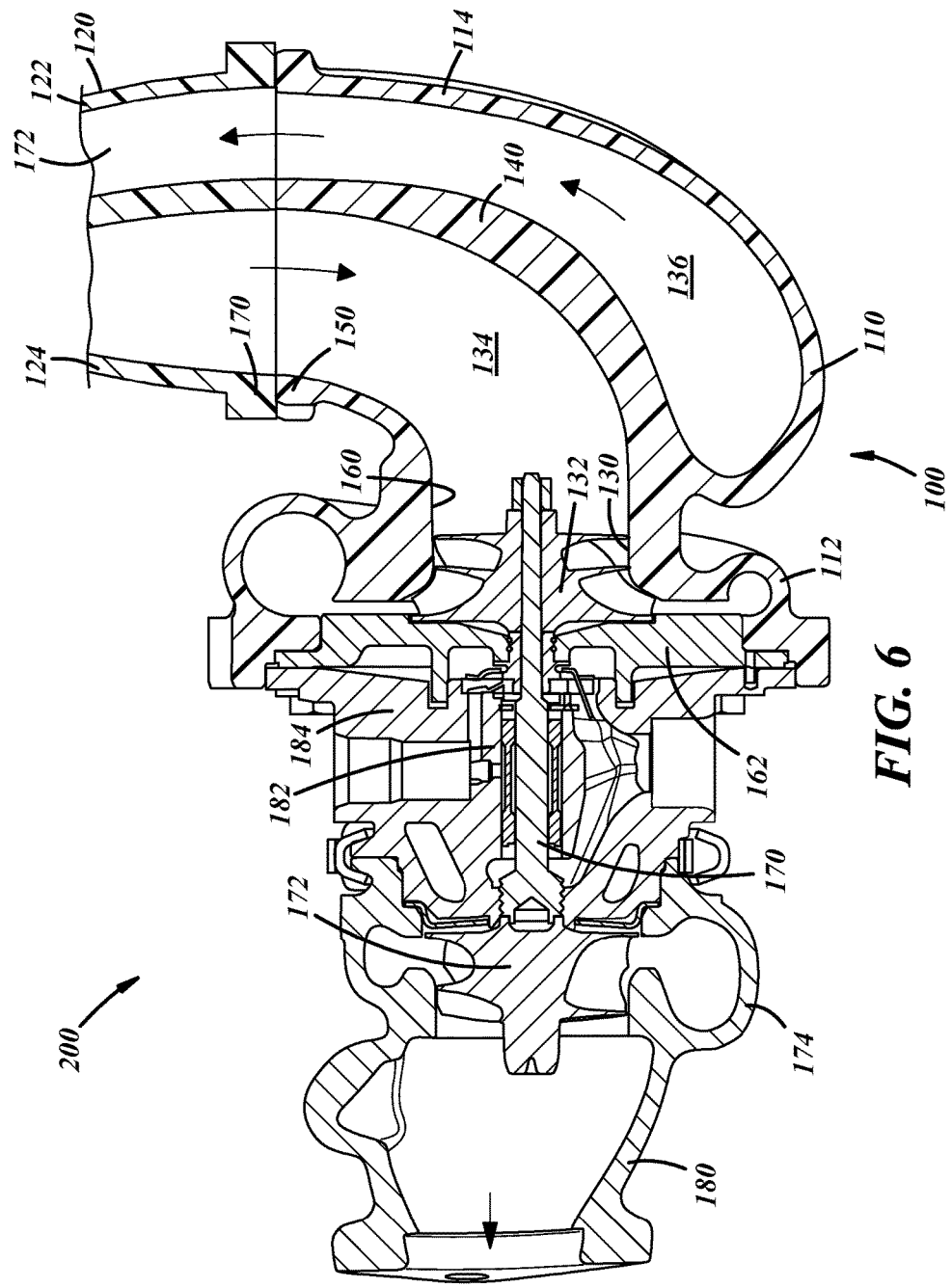
FIG. 6 is a partial cross-sectional view of a turbocharger utilizing the compressor as shown in FIGS. 2-5.

FIG. 6 is a cross-section of a turbocharger system 200 utilizing the compressor device 100 as described above. The compressor device includes the compressor housing 110 and snorkel member 120 which are connected together at mating fitting members 150 and 170.

The compressor housing has an internal central chamber 130 in which a compressor wheel 132 is positioned. Inlet air passageway 134 opens axially directly through inlet 160 into the chamber 130. A back wall member 162 encloses and seals the chamber 130.

The compressor wheel 132 is connected by shaft member 170 to a turbine wheel 172 positioned in a turbine housing 174. Rotation of the turbine wheel directly rotates the compressor wheel 172. The exhaust air and other fluids in the exhaust from the engine are expelled from the turbocharger through exhaust duct 180. The gases then are either exhausted into the atmosphere after being treated by a catalytic converter and other devices (not shown), or a portion are returned to the engine throughout an exhaust gas recirculation system (such as the one shown, for example, in FIG. 1).

Also shown in the FIG. 6 system 200 are shaft bearings 182 and a bearing housing 184.

The types, sizes and configuration of the compressor wheel and turbine wheel can be any of the standard devices known today, or which may be designed in the future. For purposes of the present invention, the invention disclosed and claimed herein is not to be limited or restricted to any particular design of the wheels.

Figure 7:
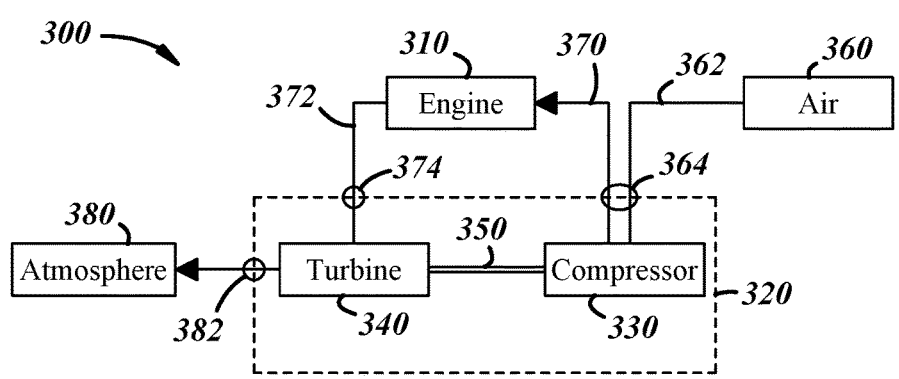
FIG. 7 is a simplified schematic depiction of a turbocharger system for an engine, the turbocharger including the compressor invention.

FIG. 7 is a representative and exemplary schematic diagram of an engine system 300 using a turbocharger, including the compressor device disclosed above. The system includes a vehicle engine 310 which preferably is a conventional gas fueled engine or a diesel engine. The turbocharger 320 includes a compressor 330 and a turbine 340 connected by a shaft member 350. The turbocharger is positioned in the engine compartment of the vehicle, typically attached to the engine block or head.

Incoming air 360 entering the engine environment is directed and passed to the compressor 330. This is shown schematically by air passageway 362. The passageway 362 (i.e. air ducts or conduits) is connected at pierce point 364 to the compressor snorkel member 120 (described above) and then into and through the compressor housing 110 as described above.

The compressed air from the compressor is then directed through the housing and snorkel member, past pierce point 364 and into the engine 310. This is shown schematically by passageway 370.

The air and other fluids exhausted from the engine 310 are then passed through passageway 372, through pierce point 374 and into the turbine 340. They are then exhausted into the atmosphere 380 as discussed above through pierce point 382.

Although an EGR system is not depicted in the system 300 of FIG. 7, an EGR system could be added as desired, as also described above.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A turbocharger compressor device comprising:
   a compressor housing member comprising a first inlet air duct and a first outlet air duct, each of said first inlet and outlet air ducts having first ends arranged at a first fitting member;
   said first inlet air duct and said first outlet air duct being positioned adjacent each other in a common connector member; and
   a compressor snorkel member comprising a second air inlet duct and a second air outlet duct, each of said second inlet and outlet air ducts having first ends arranged at a second fitting member;
   said first and second fitting members being connected together forming said turbocharger compressor device.

2. The turbocharger compressor device as set forth in claim 1 wherein said compressor housing member further comprises a chamber for a compressor wheel member.

3. The turbocharger compressor device as set forth in claim 2 wherein said first inlet air duct has a second end which communicates with said chamber in an axial direction.

4. The turbocharger compressor device as set forth in claim 3 wherein said first inlet air duct has a curved configuration, which comprises a substantially 90° curve.

5. The turbocharger compressor device as set forth in claim 2 wherein said first outlet duct has a second end which communicates with said chamber in a radial direction.

6. The turbocharger compressor device as set forth in claim 5 wherein said first outlet duct has a curved configuration and wraps around said first inlet duct.

7. The turbocharger compressor device as set forth in claim 1 further comprising a first partition wall member which separates said first inlet air duct from said first outlet air duct in said common connector member.

8. The turbocharger compressor device as set forth in claim 1 further comprising a second partition wall member which separates said second inlet air duct from said second air duct in at least a portion of said snorkel member.

9. The turbocharger compressor device as set forth in claim 1 further comprising a first partition wall member in said compressor housing member which separates said first inlet air duct from said first outlet air duct, and comprising a second partition wall member in said compressor snorkel member which separates said second inlet air duct from said second outlet air duct.

10. A method of making a compressor device for a turbo charger system, said method comprising:
    providing a compressor housing member with a first inlet air duct and a first outlet air duct, said first inlet air duct and said first outlet air duct being positioned adjacent each other in a common connector member, and each of said first inlet and outlet air ducts having first ends arranged at a first fitting member; and
    providing a compressor snorkel member with a second air inlet duct and a second air outlet duct, each of said second inlet and outlet air ducts having first ends arranged at a second fitting member; and
    connecting together said first and second fitting members to form said compressor device.

11. The method as set forth in claim 10 wherein said compressor housing member further comprises a chamber for a compressor wheel member.

12. The method as set forth in claim 10 wherein said first inlet air duct has a second end which communicates with said chamber in an axial direction.

13. The method as set forth in claim 10 wherein said first outlet duct has a second end which communicates with said chamber in a radial direction.

14. The method as set forth in claim 10 further comprising a first partition wall member in said connector member which separates said first inlet air duct from said first outlet air duct.

15. The method as set forth in claim 10 further comprising a second partition wall member which separates said second inlet air duct from said second air outlet duct in at least a portion of said snorkel member.

16. A compressor device for a turbocharger, said compressor device comprising a compressor housing member and a compressor snorkel member;

said compressor housing member having a compressor wheel chamber, an inlet air duct and an outlet air duct, said inlet air duct and outlet air duct positioned adjacent each other in a common connector member;

said compressor inlet air duct having a first end for providing inlet air axially to said compressor wheel chamber and a second end;

said compressor outlet air duct having a first end for passage of outlet air radially from said compressor wheel chamber and a second end;

said inlet air duct and said outlet air duct positioned side-by-side in said compressor housing and separated by a first partition wall member;

said second end of said compressor air inlet and said second end of said compressor air outlet having a first common connection member;

said compressor snorkel member having a second inlet duct member and a second outlet duct member, being separated at least in part by a second partition wall member and said second inlet and outlet duct member having a second common connection member;

wherein said compressor housing member and said compressor snorkel member are connected together by connection of said first and second common connection members.

\* \* \* \* \*